US012731480B2

(12) United States Patent
Sandeep et al.

(10) Patent No.: US 12,731,480 B2
(45) Date of Patent: Sep. 8, 2026

(54) FIRE EVENTS PATTERN ANALYSIS AND CROSS-BUILDING DATA ANALYTICS

(71) Applicant: Honeywell International Inc., Charlotte, NC (US)

(72) Inventors: Deepika Sandeep, Bangalore (IN); Hariprasad Kozhikkotakathitta Veetil, Bangalore (IN); Jayaprakash Meruva, Bangalore (IN); Rajesh Babu Nalukurthy, Bangalore (IN); Sundararaman Venkateswaran, Chennai (IN); Vishwanath Gupta, Ranchi (IN)

(73) Assignee: Honeywell International Inc., Charlotte, NC (US)

( * ) Notice: Subject to any disclaimer, the term of this patent is extended or adjusted under 35 U.S.C. 154(b) by 5 days.

(21) Appl. No.: 18/886,231

(22) Filed: Sep. 16, 2024

(65) Prior Publication Data

US 2025/0006041 A1 Jan. 2, 2025

Related U.S. Application Data

(63) Continuation of application No. 18/216,986, filed on Jun. 30, 2023, now Pat. No. 12,094,325, which is a (Continued)

(51) Int. Cl.
*G08B 29/14* (2006.01)

(52) U.S. Cl.
CPC .................................. *G08B 29/145* (2013.01)

(58) Field of Classification Search
CPC ...... G08B 29/145; G08B 29/00; G08B 29/04; G08B 29/14; G08B 29/20
See application file for complete search history.

(56) References Cited

U.S. PATENT DOCUMENTS 5,708,414 A * 1/1998 Peltier .................. G08B 29/145 340/630
6,407,671 B1 * 6/2002 Mulvihill ............. G08B 17/113 340/630
(Continued)

FOREIGN PATENT DOCUMENTS

| | | |
|---|---|---|
| CN | 102262690 B | 10/2013 |
| CN | 107563681 A | 1/2018 |
| WO | 2020110571 A1 | 6/2020 |

OTHER PUBLICATIONS

Dr. David J. Smith, Reliability Maintainability and Risk, seventh edition book, Dec. 31, 2005, 365 pages, UK.

*Primary Examiner* — Curtis J King
(74) *Attorney, Agent, or Firm* — Brooks, Cameron & Huebsch, PLLC

(57) ABSTRACT

Devices, systems, and methods for providing fire events pattern analysis and cross-building data analytics are described herein. One fire system maintenance system, includes a number of fire system detectors, a fire system control panel, and a gateway device all positioned within the facility, the gateway device having instructions to: collect fire system device health data associated with one or more fire or smoke detector devices and to send this fire system device health data to a remote device, the remote device having instructions to: analyze the collected fire system device health data to determine an event type for each device health event recorded in the collected data, predict future device health events, categorize the device health events based on their determined event type, and prioritize the categorized device health events based on the quantity of events categorized in each event type.

20 Claims, 5 Drawing Sheets

Related U.S. Application Data continuation of application No. 17/554,444, filed on Dec. 17, 2021, now Pat. No. 11,694,540.

(56) References Cited

U.S. PATENT DOCUMENTS

| | | | | |
|---|---|---|---|---|
| 7,117,051 | B2 | 10/2006 | Landry et al. | |
| 9,311,615 | B2 | 4/2016 | Davenport et al. | |
| 9,659,485 | B2 | 5/2017 | Piccolo, III | |
| 10,078,959 | B2 | 9/2018 | Rossi et al. | |
| 10,540,886 | B2 | 1/2020 | Hamilton et al. | |
| 10,679,491 | B1 | 6/2020 | Nalukurthy et al. | |
| 11,080,984 | B1 * | 8/2021 | Piccolo, III | G08B 3/10 |
| 11,176,804 | B1 * | 11/2021 | Piccolo, III | G08B 25/008 |
| 11,232,703 | B1 | 1/2022 | Wolf et al. | |
| 11,694,540 | B1 | 7/2023 | Sandeep et al. | |
| 2003/0051829 | A1 * | 3/2003 | Sears | A62C 2/10 160/243 |
| 2003/0058093 | A1 | 3/2003 | Dohi et al. | |
| 2004/0199212 | A1 | 10/2004 | Fischell et al. | |
| 2005/0057353 | A1 | 3/2005 | Barrieau et al. | |
| 2005/0217872 | A1 | 10/2005 | Oh et al. | |
| 2006/0017559 | A1 | 1/2006 | Albert | |
| 2007/0035407 | A1 | 2/2007 | Capowski et al. | |
| 2007/0115112 | A1 | 5/2007 | Elwell et al. | |
| 2007/0194907 | A1 | 8/2007 | Tawil | |
| 2008/0000649 | A1 | 1/2008 | Guirguis et al. | |
| 2008/0084291 | A1 | 4/2008 | Campion et al. | |
| 2008/0266076 | A1 | 10/2008 | Barrieau et al. | |
| 2008/0291036 | A1 * | 11/2008 | Richmond | G08B 19/005 340/628 |
| 2009/0000302 | A1 | 1/2009 | Edwards et al. | |
| 2010/0070097 | A1 | 3/2010 | Morgenstern et al. | |
| 2010/0302035 | A1 * | 12/2010 | Voisin | G01D 4/004 340/540 |
| 2010/0315224 | A1 | 12/2010 | Orsini et al. | |
| 2011/0018706 | A1 | 1/2011 | Egawa et al. | |
| 2012/0032794 | A1 | 2/2012 | Barrieau et al. | |
| 2012/0286946 | A1 | 11/2012 | Karl et al. | |
| 2013/0049951 | A1 | 2/2013 | Kalivas et al. | |
| 2013/0057696 | A1 * | 3/2013 | Felt | H04N 7/186 348/158 |
| 2013/0082832 | A1 | 4/2013 | Anderson, Jr. et al. | |
| 2014/0266675 | A1 | 9/2014 | Piccolo, III et al. | |
| 2014/0266676 | A1 | 9/2014 | Piccolo, III et al. | |
| 2014/0340215 | A1 | 11/2014 | Piccolo, III et al. | |
| 2014/0375449 | A1 | 12/2014 | Piccolo, III et al. | |
| 2015/0248832 | A1 | 9/2015 | Piccolo, III et al. | |
| 2015/0287311 | A1 * | 10/2015 | Smith | G06Q 50/40 340/521 |
| 2015/0302727 | A1 | 10/2015 | Piccolo, III | |
| 2016/0041537 | A1 | 2/2016 | Landou et al. | |
| 2016/0093203 | A1 | 3/2016 | Hamilton et al. | |
| 2017/0213303 | A1 | 7/2017 | Papadopoulos et al. | |
| 2018/0011461 | A1 | 1/2018 | Camarasa et al. | |
| 2018/0012482 | A1 | 1/2018 | Brown et al. | |
| 2018/0046149 | A1 | 2/2018 | Ahmed | |
| 2018/0075733 | A1 | 3/2018 | Brown et al. | |
| 2018/0122221 | A1 | 5/2018 | Norton et al. | |
| 2018/0197404 | A1 | 7/2018 | Warren et al. | |
| 2018/0308475 | A1 | 10/2018 | Locke et al. | |
| 2018/0375678 | A1 | 12/2018 | Lapsley et al. | |
| 2019/0213865 | A1 | 7/2019 | S R et al. | |
| 2019/0291866 | A1 | 9/2019 | Jegodtka et al. | |
| 2020/0066125 | A1 | 2/2020 | Boguslawski et al. | |
| 2020/0242916 | A1 | 7/2020 | Krstanovic et al. | |
| 2020/0356087 | A1 | 11/2020 | Elbsat et al. | |
| 2020/0380838 | A1 | 12/2020 | Barson et al. | |
| 2021/0003310 | A1 | 1/2021 | Shnaiderman et al. | |
| 2021/0142649 | A1 | 5/2021 | Cordoba | |
| 2021/0241595 | A1 | 8/2021 | Young et al. | |
| 2021/0252321 | A1 | 8/2021 | Fazzio et al. | |
| 2021/0331015 | A1 | 10/2021 | Henke et al. | |
| 2021/0350693 | A1 | 11/2021 | Nalukurthy et al. | |
| 2022/0070672 | A1 | 3/2022 | Zhang et al. | |
| 2022/0084390 | A1 | 3/2022 | Wadhwani et al. | |
| 2022/0101700 | A1 | 3/2022 | Deshpande et al. | |
| 2022/0101701 | A1 | 3/2022 | Date et al. | |
| 2022/0172590 | A1 | 6/2022 | Moix | |
| 2022/0241634 | A1 | 8/2022 | Krutskevych et al. | |
| 2022/0277643 | A1 | 9/2022 | Golob et al. | |
| 2023/0034481 | A1 | 2/2023 | Benton et al. | |
| 2023/0186756 | A1 | 6/2023 | Kulkarni et al. | |
| 2024/0108930 | A1 * | 4/2024 | Ranchod | G08B 29/043 |

* cited by examiner

FIRE EVENTS PATTERN ANALYSIS AND CROSS-BUILDING DATA ANALYTICS

PRIORITY INFORMATION

This application is a Continuation of U.S. application Ser. No. 18/216,986, filed on Jun. 30, 2023, which is a Continuation of U.S. application Ser. No. 17/554,444, filed on Dec. 17, 2021, the contents of which are incorporated herein by reference.

TECHNICAL FIELD

The present disclosure relates to devices, systems, and methods for providing fire events pattern analysis and cross-building data analytics.

BACKGROUND

Facilities (e.g., buildings), such as commercial facilities, office buildings, hospitals, and the like, may have a fire detection system that can be triggered during an emergency situation (e.g., a fire) to warn occupants to evacuate. For example, a fire detection system may include a fire alarm control panel within the building and a plurality of detectors located throughout the building (e.g., on different floors and/or in different rooms of the building) that can sense things, such as a heat condition indicative of a fire, smoke particulate, and/or chemical compounds that are occurring in the building, that may be harmful to occupants, and provide a notification of the sensed condition to the occupants of the building and/or building monitoring personnel via alarms or other mechanisms.

Fire system technicians do periodic maintenance of fire systems at a facility, sometimes as per regional regulatory recommendations. It has been observed that several times facility owners reported an issue after periodic maintenance is completed, it might be due to failure of devices which were checked and were in acceptable working condition during the maintenance period but fell into a failure mode a few days after service.

This leads to a technician visiting the site again and fixing the issue which results in an unplanned site visit and causes extra maintenance cost. Typically, a technician will have ~4 unplanned visits per building per year.

The traditional approach has been simply to visit sites when the customer reports problems to carry out a repair or accomplish replacement work which increases the number of site visits and the maintenance cost of the facility.

In another problem, malfunction of detectors will lead to false and unwanted alarms being generated from the fire system. False alarms from remotely monitored fire detection and fire alarm systems cost businesses and Fire and Rescue Services (FRSs) an estimated £1 billion a year in the UK. FRSs in Britain received 584,500 callouts; 53.4% of which were false alarms. Considerable drain on fire authority resources, causes business disruptions (leading to a loss of productivity), and reduces the confidence of the general public in fire alarms.

DETAILED DESCRIPTION

Figure 1:
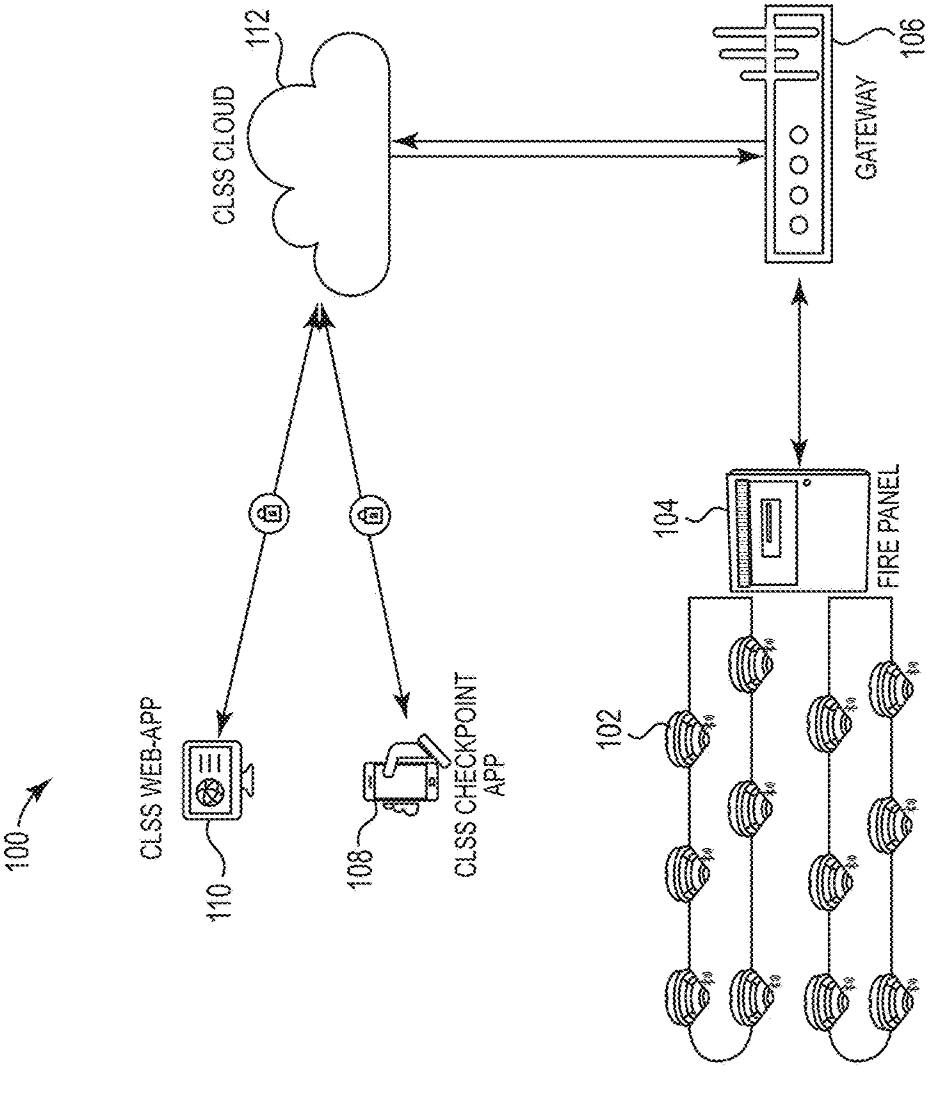
FIG. 1 is an example of a fire alarm system where the detectors are disbursed around a facility in accordance with one or more embodiments of the present disclosure.

Devices, systems, and methods for providing fire events pattern analysis and cross-building data analytics. The embodiments of the present disclosure provide maintenance analytics for determining device inspection, maintenance, and/or replacement for service issues that are causing the largest numbers of total trouble events for a fire system and, based on that information, a scheduling utility can schedule to address those issues when a service technician will be on site at a facility.

The embodiments of the present disclosure also provide event pattern analytics for determining particular facilities, buildings, zones, and/or devices and/or service events that generate the most service visits and, based on that information, a scheduling utility can associate service items with a technician's schedule to address those issues when a service technician will be on site at a facility. This can allow for a majority of trouble events to be reduced or eliminated before they occur.

Further, where multiple buildings are being serviced, the embodiments of the present disclosure provide cross building data analytics for determining which service issues across multiple buildings are creating significant numbers of trouble events and/or which buildings generate a significant number of the total number of trouble events and, based on that information, a scheduling utility can associate service items with a technician's schedule to address those issues when a service technician will be on site at a facility or look at particular trouble event types to identify how to significantly reduce trouble event types or service visits based on certain trouble event types. Additionally, machine learning can be utilized in some embodiments to analyze this data and determine if changes can be made to the operation of the fire system, one or more of its components, and/or the maintenance scheduling process to reduce the number of trouble events and/or service visits due to trouble events, based on the analysis of which service issues are causing a significant portion of the total number of trouble events.

One example embodiment of a fire system maintenance system includes a number of fire system detectors positioned within a facility, a fire system control panel positioned within the facility, and a gateway device positioned within the facility and in communication with at least one of the fire system control panel or fire system detectors.

The gateway device having a processor and memory with the memory having instructions and data stored therein. The instructions being executable by the processor to collect fire system device health data associated with one or more fire or smoke detector devices and to send this fire system device health data to a remote device.

The remote device can be located physically remotely from the facility, or remote with respect to its communication connection to the local devices. The remote device can have a display, a processor and memory, the memory having instructions and data stored therein. For example, the fire control panel, gateway device, and fire system detectors communicate with each other via a local network and the remote device communicates with the devices on the local network via a remote network. The analyzing, identifying, and associating functions can also be provided by a fire system maintenance solution application that is provided as an Internet accessible application.

The instructions on the remote device can be executable by the processor to analyze the collected fire system device health data to determine an event type for each device health event recorded in the collected data. The instructions can also categorize the device health events based on their determined event type and prioritize the categorized device health events based on the quantity of events categorized in each event type.

In some embodiments, the fire system maintenance system further includes a fire system maintenance solution application that determines whether a service item is associated with an event type and correlates the service item with the event type in the system. In such embodiments, the fire system maintenance solution application can identify a nearest in time scheduled maintenance visit to be performed by a fire system device technician and associate the correlated service item with the scheduled maintenance visit to provide service by the technician to repair, update, or replace a fire system device.

In some embodiments, a gateway functionality can be provided by communication components (e.g., a transmitter and/or receiver) within the detector devices or a separate gateway device at the facility. For example, an aspiration detector device can include a number of communication components that provide transmission and reception capabilities in order for detector data to be passed out of the detector device and instructions and updates to be passed to the detector device, for instance from memory locations in a cloud environment, configuration or commissioning tools, and/or a software application for analyzing detector data and providing analytics about the fire system located on a non-mobile or mobile remote device.

Figure 2:
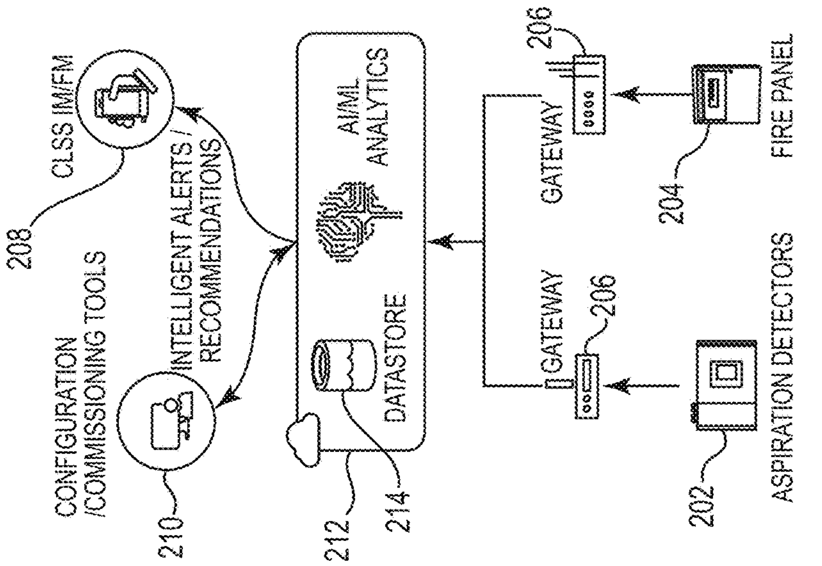
FIG. 2 is an example of a fire alarm system where the detection of a smoke or fire condition is determined at a central location at a facility in accordance with one or more embodiments of the present disclosure.

Also, in some embodiments, detector devices can communicate with other components of the system without communicating through the fire panel. Such an example is illustrated in FIG. 2 where the detector devices and the fire panel communicate through different gateways.

Although the cloud environment is referenced herein, the cloud environment can be implemented by an external communication connection from the detector devices and/or fire panel at a facility being monitored to a remote server that is remote (not located at) from the facility. In some embodiments, this remote arrangement allows the remote server (e.g., cloud server) to provide similar services described herein to multiple fire systems at multiple facilities for, potentially, multiple different facility owners.

As discussed, the embodiments of the present disclosure propose a predictive and/or preventive maintenance solution which monitors performance of a fire system to predict faults and failures, among other functions. For example, the fire system maintenance solution alerts an operator when detector performance has become degraded and requires recalibration, adjustment, or replacement of a component of a detector device or the entire detector device.

In this solution, a gateway device will periodically collect device health data, such as obscuration level, Drift %/Drift Compensation %, Alarm sensitivity levels, Peak %, Percent of Alarm, etc. and send the collected data to a remote device such as a cloud server. (e.g., periodicity could be any suitable period, such as once in a day). Different types of analytics are carried out on this data to predict one or more event types at a facility, building, zone, and/or device level that create the most trouble events, alert technicians, and report those event types to a technician when the technician is scheduled for a site visit, for example, for regular maintenance.

Event type analysis can be utilized to determine if one or more event types are significantly contributing to a total number of trouble events. For example, by applying a Pareto analysis a process can be employed wherein a threshold, such as 80 percent can be determined and the types of events contributing to 80 or more percent can be identified. Through this analysis process those event types creating over 80 percent of the total trouble events can be focused on and potentially resolved, thereby significantly reducing the total number of events in the current time period and potentially in future time periods.

Embodiments of the present disclosure can also identify devices which might require maintenance. Events data from devices across buildings are analyzed and a machine learning method is employed in order to predict chain reactions among events, based on the patterns in historical events data. An association mining algorithm, Apriori learns causal patterns in events and predicts future occurrences of events, based on these causal relationships. This information can then be used to add this task to a list of tasks to be accomplished by a technician that is scheduled to be at the facility at or near that timeframe.

Such embodiments enable the fire system maintenance solution to do better at planning of upcoming regular maintenance by including predicted actions that may occur at or near the timeframe of the scheduled maintenance visit to the facility. Some embodiments of the present disclosure can also bring intelligent analysis reports on buildings using unusual patterns and eases handover of sites during fire system maintenance management changes. Embodiments of the present disclosure can also shift management of a facility from unplanned to planned, condition-based maintenance, wherein, when a condition is met (e.g., event type that contributes significantly to a total trouble event total is occurring or imminent), service is to be performed.

Embodiments of the present disclosure can combine predicted maintenance service issues (service issues that may result in generation of a trouble event if left unresolved) as part of a regular building inspection schedule and thereby reduce number of site visits. Such an implementation can save on unexpected truck rolls, when one or more service trucks are dispatched to a facility.

For example, by predicting an estimated number of service issues that can be combined with an upcoming inspection schedule the fire system maintenance solution application can provide an indication of the number of truck rolls that can be reduced. This feature reduces the number of false or unwanted alarms and/or can reduce the cost of fees from a fire brigade response to attend to false alarms. The type of data obtained by the dedicated software can, for example, be volatile integer data representing environment temperature at a zone within a facility (e.g., a room within a building).

Additionally, this data can be stored in random access memory (RAM) and used for fire alarm system maintenance scheduling or, at application level, stored into a non-volatile RAM (NVRAM) for diagnostic purposes to evaluate whether a service issue is present at a device using different types of algorithms (e.g., average, mode, etc.). This layer can be provided, for example, to one or more of the remote devices.

In this detailed description, reference is made below to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a fire alarm system where the detectors are disbursed around a facility in accordance with one or more embodiments of the present disclosure. FIG. 1 includes a fire system maintenance system 100, including a number of fire system detectors 102 (fire system devices) positioned on-premise (i.e., within a facility having a fire alarm system therein), a fire system control panel 104 positioned within the facility, and a gateway device 106 positioned within the facility and in communication with at least one of the fire system control panel 104 or fire system detectors 102 that are also on-premise.

The gateway device 106 includes a processor and memory, with the memory having instructions and data stored therein. The instructions are executable by the processor to collect fire system device health data associated with one or more fire or smoke detector devices and to send this fire system device health data to a remote device.

The remote device is located remotely physically off-premise (i.e., not within the facility) from the facility or communicates with the on-premise devices as if the remote device was located off-premise (i.e., through a non-local network) and has a processor and memory. A suitable remote device can be a mobile device 108, such as a mobile phone, tablet, watch, or laptop, or a non-mobile device 110, such as a desktop computing device or server computing device that hosts or provides access to the software application for fire system maintenance or provides storage and/or analysis of collected fire system device health data, such as a cloud server 112 or other remote device 108 and/or 110.

As discussed above, the remote device can be a mobile or non-mobile device and can perform the analyzing, identifying, and associating functions discussed above. For example, such functions can be accomplished by a fire system maintenance solution application provided on the remote device or via a web browser/portal allowing access to the application on the remote device. In some embodiments, a server, such as a cloud server can host the fire system maintenance solution application and access to the fire system maintenance solution application can be provided via a remote device, such as mobile device 108 or non-mobile device 110, via a software application resident on the remote device 108 or 110 or via an Internet accessible application (web browser/portal) accessed through the remote device 108 or 110.

FIG. 2 is an example of a fire alarm system where the detection of a smoke or fire condition is determined at a central location at a facility in accordance with one or more embodiments of the present disclosure. FIG. 2 provides a different implementation wherein the system includes multiple gateway devices 206 and the remote devices 208, 210, and 212 provide additional functionalities. In this implementation, the detector(s) 202 have their own gateway device that communicates with the remote devices. Although shown outside of the devices 202 and panel 204 in the embodiment of FIG. 2, the gateway functionality may be located within the devices 202 and/or panel 204, thereby eliminating a physically separate gateway device.

As with its implementation in FIG. 1 at 112, the remote device 212 includes a processor and memory therein. The memory can include a datastore 214 for storing data collected from the fire system devices and/or for operating the fire system maintenance solution application. The fire system maintenance solution application can, for example, be stored in memory on the remote device 212 including executable instructions and data to perform its functions as described in more detail below. The functionalities of configuration and/or commissioning tools, intelligent alerts and/or recommendations, and analytics processing and/or display can be provided on any of the remote devices 208, 210, and/or 212.

Figure 3:
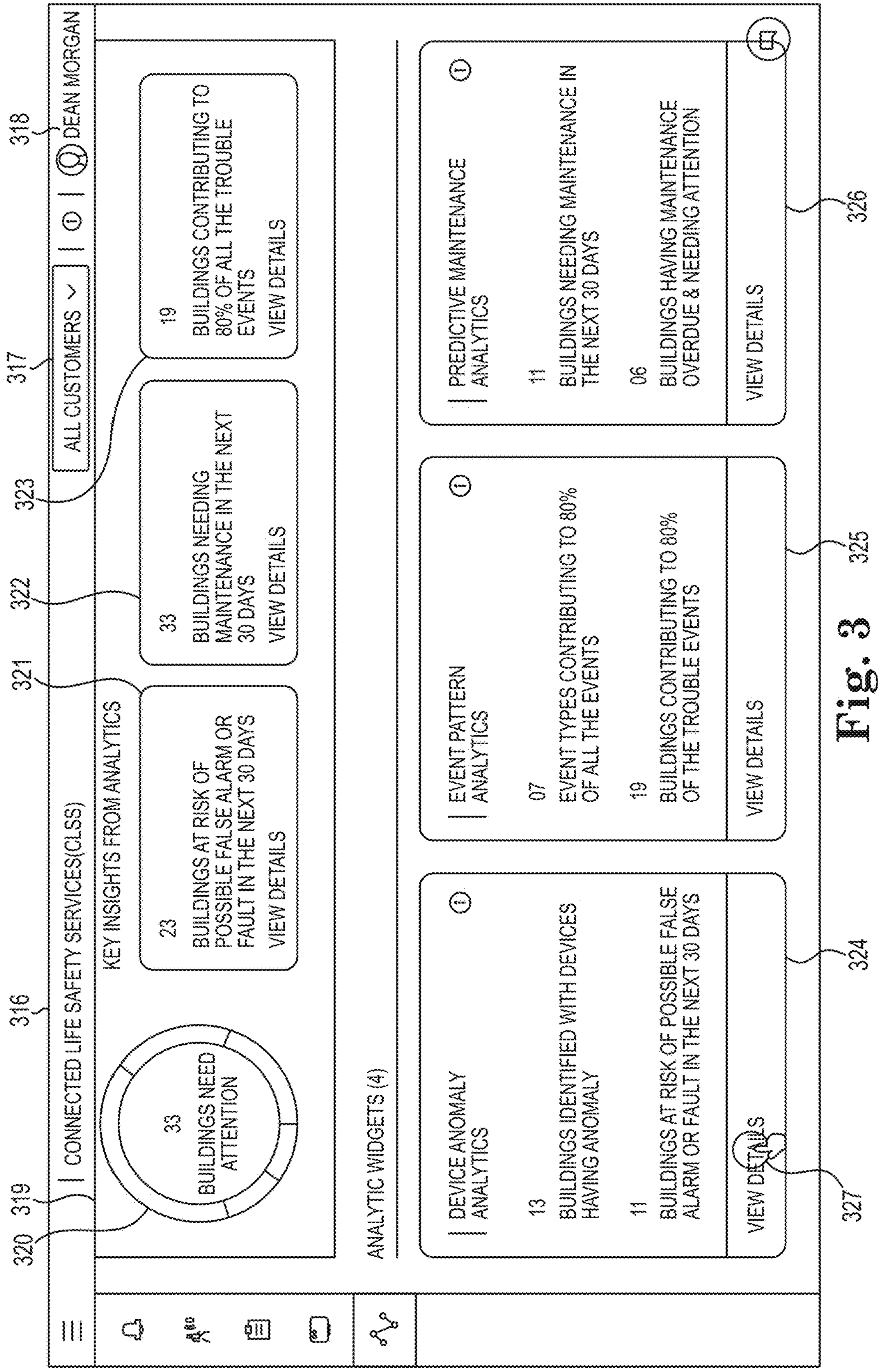
FIG. 3 is an example of a display providing information to a fire system user on a remote device in accordance with one or more embodiments of the present disclosure.

FIG. 3 is an example of a display providing information to a fire system user on a remote device in accordance with one or more embodiments of the present disclosure. In FIG. 3, one screen of the fire system maintenance solution application is shown. The fire system maintenance solution application allows a user, such as a service scheduler or service technician to see various information about one or more facilities managed by the fire system maintenance solution application (belonging to one entity or multiple entities), a specific facility, buildings within the facility, and/or devices with a building of the facility.

On the screen, illustrated in the embodiment of FIG. 3, the display 316 shows that a particular user 318 can log in to the system, for example via remote device 108/208 or 110/210 of FIGS. 1 and 2. In this manner, the fire system maintenance solution application can access data about the logged in user (Dean Morgan) and configure the screen to include information specific to one or more of the user's customers.

In this example, the screen is displaying information about all of the user's customers, but the display 316 includes a selector 317 that allows the user to select one or more customer's data to include in the analysis of data. This selection will limit the data analyzed by the system to those customers selected by the user. Selecting more than one customer can be beneficial, for example, to determine whether there are trouble events (e.g., processes or procedures) that are causing untimely service visits, device breakdowns or other device issues, and/or false alarms by the fire system.

In this manner, the system providing the fire system maintenance solution and associated service processes and procedures can be improved. In some embodiments, the system can analyze the collected data and automatically identify issues and make improvements to its processes and procedures for service visits, for example, through use of machine learning/artificial intelligence implemented by the processor through execution of instructions stored in memory.

In the illustrated embodiment, a key insights section 319 is presented that allows the user to identify some analytical data that may be of interest to them. Shown in the example are the number of buildings needing attention (33 buildings) 320, buildings at risk of a possible false alarm or fault during a particular time period (23 buildings in a 30 day period) 321 (e.g., for all time periods and percentages discussed herein, they can be set by the user or provider of the fire system maintenance solution application and can be the same or different from each other), buildings needing maintenance during a particular time period (33 buildings in a 30 day period) 322, and buildings contributing to a percentage of all trouble events (80%) 323 (e.g., percentage can be set by the user or provider of the fire system maintenance solution application or can be a movable percentage, such as the building producing the largest percentage of total trouble events). A user can select any of these displayed areas (320, 321, 322, 323) to see more detailed information/data about the area selected.

Also included in the areas presented on the screen 316 are a number of areas regarding device anomaly analytics 324, event pattern analytics 325, and predictive maintenance analytics 326. In some embodiments of the present disclosure, the user or provider of the fire system maintenance solution application can select which information from the system to present on screen 316 and the arrangement of the different areas depicting that information. In this manner, the screen may be customized to best suit a particular user or use of the fire system maintenance solution application (e.g., focus the information on general, non-customer specific information versus focusing on a particular customer's service processes and procedures).

The information depicted in the example implementation of the device anomaly area 324 illustrated in FIG. 3 includes buildings identified with devices having an anomaly (13 devices) and buildings at risk of possible false alarm or fault during a particular time period (11 buildings in a 30 day period). Anomaly detection can be accomplished in any suitable manner, for example, an anomaly can be detected by comparing data collected (e.g., at a present time) from a particular device within the building and comparing that data with data collected from that device at a previous time or during a previous time period. This and other comparative data discussed herein can, for example, be stored in memory on a system device and accessed by the fire system maintenance solution application. An anomaly can also be identified by comparison of the collected data with data from one or more other devices (e.g., one or more devices of a group of customers, a particular customer, a particular facility, a particular building, or an area within a particular building). An anomaly can also be identified by comparison of the collected data with a threshold value or to a range of values as discussed in more detail below with respect to FIGS. 5-7.

The risk of a false alarm or fault can be determined in any suitable manner. For example, the identification of an anomaly can be one factor in determining whether a false alarm or fault will occur during a particular time period. Further, in some implementations, the system can have access to service records that can provide information about the health condition of a particular fire system device and this information can be compared to maintenance, repair, and/or replacement timeframes for one or more components of the device and/or the device itself to determine a likelihood of a false alarm or fault occurring within a particular time period.

The information depicted in the example implementation of the event pattern analytics area 325 illustrated in FIG. 3 includes the event types contributing to a particular percentage (80%) of all events (7 event types) and buildings contributing to a particular percentage (80%) of the trouble service events (19 buildings).

In some embodiments, the multiple types of service events can be tracked and that information saved in memory. The collected and saved data can then be analyzed to identify how many service items of each type are occurring over a time period and/or the event types contributing to a particular percentage of all service related events.

Likewise, data can be collected from the fire system devices from a number of buildings and this data can be saved in memory and then analyzed to determine the buildings contributing to a particular percentage of the trouble service events as a group and/or individually. For such an embodiment, the percentage of a total number of false alarms can be calculated, for example, by collecting fire system device health data for multiple devices over a period of time and analyzing the collected data to determine a percentage value for how much each building in the facility contributes to a total number of false alarms.

Additionally, how much each building in the facility contributes to a total number of service items can be calculated. For example, this could be accomplished by collecting fire system device health data for multiple devices over a period of time and analyzing the collected data to determine a percentage value for how much each building in the facility contributes to a total number of service items.

The information depicted in the example implementation of predictive maintenance analytics 326 illustrated in FIG. 3 includes buildings needing maintenance in a particular period of time (11 buildings) and buildings having maintenance overdue and needing attention (6 buildings). To determine what buildings need maintenance, as discussed above, in some implementations, the system can have access to service records that can provide information about the health condition of a particular fire system device or component of a fire system device and this information can be compared to maintenance, repair, and/or replacement timeframes for one or more components of the device and/or the device itself to determine whether a particular building will need maintenance within a particular time period. In some implementations, these records can be obtained from data collected from the fire system devices or stored in memory on a gateway device and/or remote device. Such data can also be analyzed to determine if maintenance is overdue. It should also be noted that a user of the system may view additional detail of any of the areas 321, 322, 323, 324, 325, or 326 by selecting that area as illustrated at 327.

Figure 4:
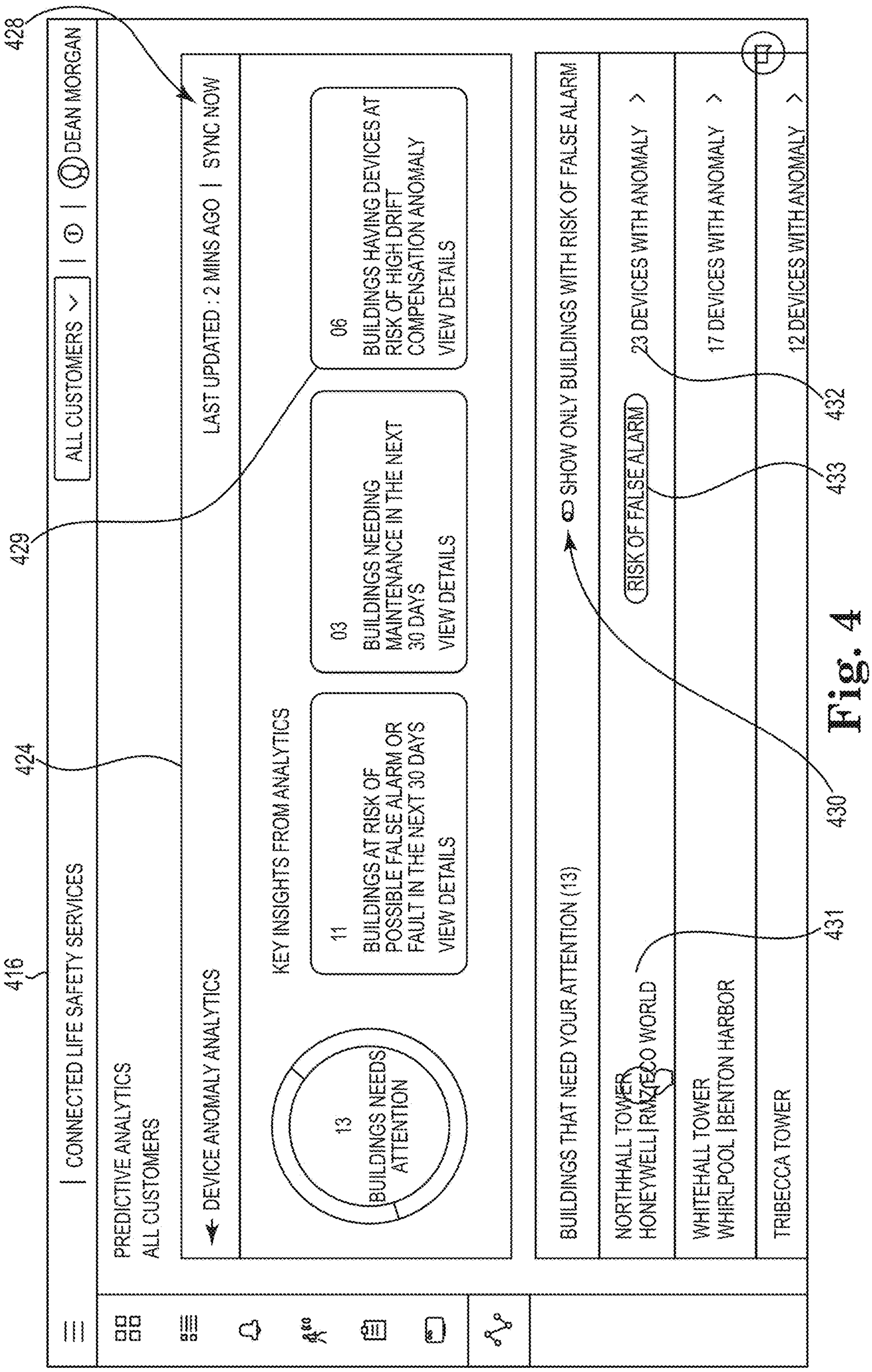
FIG. 4 is an example of a display providing information to a fire system user on a remote device in accordance with one or more embodiments of the present disclosure.

FIG. 4 is an example of a display providing information to a fire system user on a remote device in accordance with one or more embodiments of the present disclosure. FIG. 4 illustrates a screen 416 with additional detail that could, for example, be displayed to a user when the device anomaly analytics area 324 of the screen displayed in FIG. 3 is selected.

In the illustrated embodiment of FIG. 4, the screen includes analytics regarding device anomalies at 424. In some implementations, the system can allow for the user to see how old the data is and/or enable the user to update the data in real time at 428. This will allow the user to have confidence that the data and scheduling therefrom will be accurate, among other benefits.

As with the first screen, the screen 416 can be configured to include a key insights section. Here, two areas are the same as on the screen 316, but one area includes buildings having devices at risk of high drift compensation at 429, described in more detail below. As discussed, the screen may be configured differently for different users and, therefore, the areas on screens 316 and 416 may be the same or different, or arranged the same or differently.

Also included on the screen is a list of buildings 431 that need attention including those of two different customers (e.g., Honeywell and Whirlpool) since the screen indicates this list is for all customers. For each building an indicator 432 indicates how many devices within the building are identified as having an anomaly.

Further, this embodiment also includes an identifier that there is a risk of false alarm 433. This feature may be helpful in aiding the user to quickly identify which devices should be serviced first to avoid other adverse issues, such as a false alarm notification being issued, which could result in dispatching emergency personnel, among other issues.

Additionally, some embodiments may include a mechanism to select high priority items from the list 430. In this example, a selection switch can be enabled to only show buildings with service items indicating a risk of false alarm, however, other embodiments can filter using other high priority items.

The data provided by the inspection application or commissioning application can be presented in a report that can include such things as the status of visual inspections for a number of devices, anomalies in the data, event devices inspection issues, remedies implemented to resolve such issues, functional device test status and/or results, and/or other useful data. This can be provided as a printed report or an electronic report and can be provided on the mobile device and/or be delivered to a remote device where it could be accessible by a building owner or administrator, supervisor of the alarm system, or other person or entity needing such information.

Figure 5:
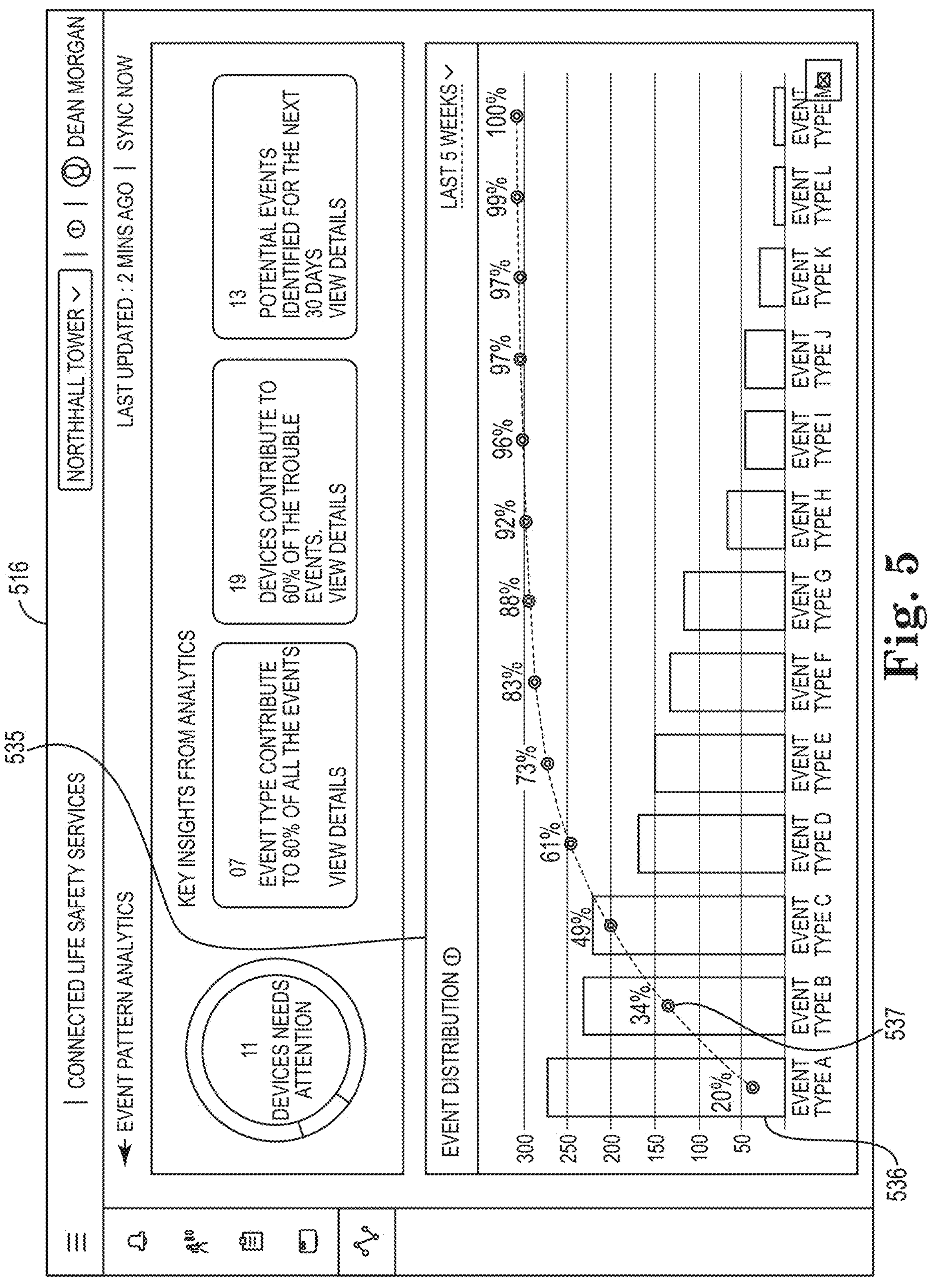
FIG. 5 is an example of a display providing information to a fire system user on a remote device in accordance with one or more embodiments of the present disclosure.

FIG. 5 is an example of a display providing information to a fire system user on a user mobile device in accordance with one or more embodiments of the present disclosure. FIG. 5 illustrates a Pareto analysis of the collected data that has been classified by event type (e.g., event types A-M identified un the bar graph 535 on the displayed screen 516). The concept here is to identify those events that contribute a predetermined amount of the trouble events reported. A Pareto analysis is typically 80 percent, but the predetermined amount can be any suitable threshold amount. The concept here is to analyze the data to determine if there are event types that are causing a significant amount of the total trouble events and then focusing efforts on those event types to try to eliminate them, for example, by preemptively addressing them with a service visit before the issue becomes a trouble event.

Event related data can also be analyzed by the system to determine links between events and/or order of events in a chain reaction. This information can be used to predict later events in a chain of events. This can be accomplished by monitoring the data for events the occur early in the chain of events. If an early event in a chain is identified, a task can be associated with an upcoming service visit to address the issue that is causing or will cause the early event in the chain to occur.

Additionally, since the early event in the chain has been identified, it may be possible to preemptively address the subsequent events in the chain at the same time (associating service items with the same service visit, or plan service items with other future service visits to timely handle an issue before it becomes a trouble event. In this manner, smaller issues may be addressed before larger subsequent issues caused by the lack of attention to those smaller issues can addressed, thereby avoiding the large issues/events. This may reduce downtime for parts of or the entire system due service visits.

In one example, an order of events by quantity from most events to least includes: Other, Non-Fire Activation, Cleared Non-Fire Activation, Fire Trouble, Cleared Fire Trouble, and Acknowledged Fire Trouble, which in total contribute 83% of all the maintenance service events for the system (events A-F in FIG. 5 illustrated by the sum of each percentage to that of the previous event types at 537). This analysis can be accomplished by executable instructions of a software application stored in memory wherein a threshold value is set (e.g., preset in the application or set by a system user), the data is grouped by event type and then the event type totals are added from most events to least events until the threshold value is reached.

In the above example, Other encompassed—20 percent, Non-Fire Activation encompassed—15 percent, Cleared Non-Fire Activation—14 percent, Fire Trouble—13 percent, Cleared Fire Trouble—11 percent, and Acknowledged Fire Trouble—10 percent, which in total contribute 83 percent. Once the threshold of 80 percent is satisfied, the system can stop evaluating the remaining event totals (e.g., Fire Alarm—5 percent, Cleared Fire Alarm—4 percent, Acknowledged Fire Alarm—4 percent are the next three event types that were not included in the threshold analysis above). Such data can be used to prioritize the areas in which technicians should address and resolve first with respect to how events are resolved.

For example, based on the data, the system can select an event type from the group of event types, including: Cleared Non-Fire Activation, Non-Fire Activation, Fire Trouble, Cleared Fire Trouble, and Acknowledged Fire Trouble to be addressed and resolved first, second, third, etc. If the events falling in the Other category can be determined, then the Other category can be included as another event type.

In various embodiments, the data that is analyzed can be from a particular device, a particular group of devices within a building (e.g., a zone having multiple devices), all devices within a building, devices within multiple buildings of a facility.

This may be beneficial where, for example, one group of devices may have a different hierarchy of event types and therefore could benefit from a different analysis of which event types to address before other event types. For example, another group of devices (different from those analyzed above) has event type percentages of: Cleared Non-Fire Activation—32 percent, Non-Fire Activation—31 percent, Fire Trouble—13 percent, which in total contribute 86 percent (e.g., Cleared Fire Trouble—10 percent, and Acknowledged Fire Trouble—9 percent, and Other—4 percent are the next three event types that were not included in the threshold analysis above).

Figure 6:
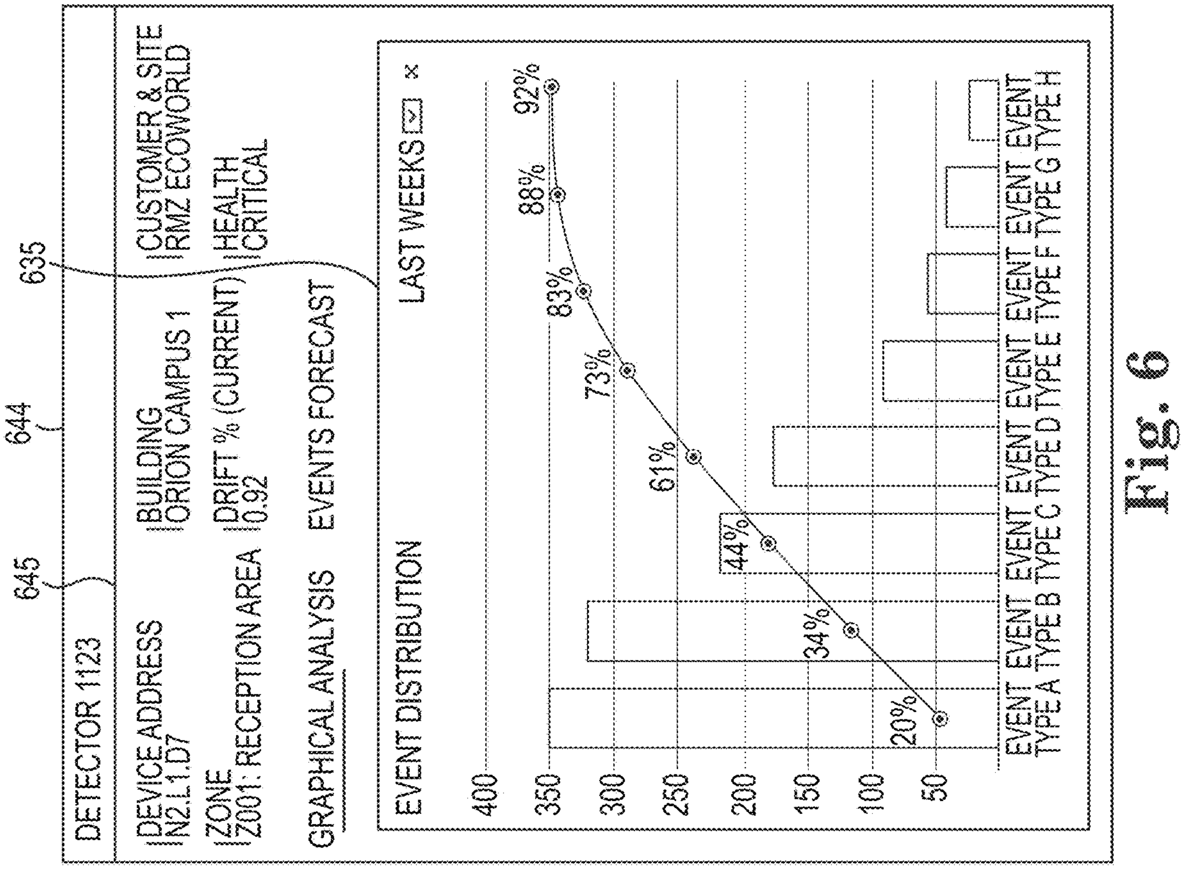
FIG. 6 is an example of a display providing information to a fire system user on a remote device in accordance with one or more embodiments of the present disclosure.

FIG. 6 is an example of a display providing information to a fire system user on a remote device in accordance with one or more embodiments of the present disclosure. In this example, new information about the device is provided in a screen 644 at 645.

The additional device information can be helpful for the technician to locate and diagnose the service item. This can be particularly beneficial when the fire system maintenance solution application is provided on a mobile device that can be carried/worn by the technician.

Any suitable information about the device or its status can be provided on this screen. In the example of FIG. 6, the information includes device address, customer identification (customer name), facility (site) in which the device is located, building in which the device is located, a defined area (zone) within the building in which the device is located, drift value, and a health status indicator (critical) that identifies a classification of the health status of the device for sorting those devices needing more immediate assistance.

In some embodiments, the screen 644 can include an event type summary graph 635 similar to that illustrated in FIG. 5. This summary can assist the technician in prioritizing service items when preparing for a site visit (e.g., determining what equipment to bring (e.g., ladder, testing equipment, calibration equipment, repair equipment) or quantity of certain service parts, based on the event types that are most often reported for the area of the facility to be serviced during on upcoming service visit and which may be a priority for the service visit due to their quantity versus other event types.

Provided below are two additional embodiments of the present disclosure, one is a fire system maintenance solution device and the other is a method embodiment.

In this fire system maintenance solution device embodiment, the device receives collected fire system device health data associated with one or more fire or smoke detector devices of a facility with a remote device. The remote device can be located remotely from the facility and having a processor and memory. In some embodiments, the remote device is on-premise of the facility, but is communicating via a remote network connection to the on-premise fire system devices.

The memory has instructions and data stored therein. The instructions being executable by the processor to analyze the collected fire system device health data to determine an event type for each device health event recorded in the collected data; categorize the device health events based on their determined event type; and prioritize the categorized device health events based on the quantity of events categorized in each event type.

In some embodiments, the device includes a group of multiple event types and wherein the determined event types for each device health event are selected from the group of multiple event types. For example, the multiple event types can be created by a user of the fire system maintenance solution device.

In various embodiments, each event type corresponds to at least one service item that can be added to a task list of a scheduled visit to the facility. Further, two or more event types can be causally linked wherein a first event type causes a second event type.

The method embodiment includes receiving, via an off-premise remote device, fire system device health data, collected from an on-premise gateway device of a fire system within a facility, associated with one or more on-premise fire or smoke detector devices; analyzing, via executable instructions on the off-premise remote device, the collected fire system device health data to determine an event type for each device health event recorded in the collected data; and categorizing the device health events based on their determined event type; and prioritizing the categorized device health events based on the quantity of events categorized in each event type.

In some embodiments, the method further includes periodically reviewing, via executable instructions on the off-premise remote device, the associations of service items and determining whether these service items should be added to a regular scheduled maintenance visit list of tasks. A method can further include periodically reviewing, via executable instructions on the off-premise remote device, the associations of service items and determining whether these service items should be added to a scheduled maintenance visit list of tasks for the particular scheduled maintenance visit.

In some such embodiments, the instructions on the remote device are executable to present, via the display, the prioritization of the categorized device health events. This can, for example, be accomplished by collecting fire system device health data for multiple devices over a period of time and analyzing the collected data to determine a percentage value for how much each building in the facility contributes to a total number of trouble events. The collecting fire system device health data for multiple devices over a period of time and analyzing the collected data can be used, for example, to determine a percentage value for how many events of each event type occur for each device in a particular zone within a building contributes to a total number of trouble events. In implementations where there are multiple types of services items, the method can further include analyzing the associated service items to determine how many service items of each type are occurring over a time period.

As discussed, the embodiments of the present disclosure propose a predictive and/or preventive maintenance solution which monitors performance of a fire system to determine trouble event types that are substantially impacting the system or portions or devices thereof, among other functions. Such features can be very beneficial in servicing fire systems and maintaining fire system reliability, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A remote computing device for providing collected fire system data of a fire system maintenance system, comprising:
   a fire system maintenance solution application thereon; and
   a memory, wherein the memory includes executable instructions executed by a processor that when executed, cause the processor to:
      receive collected fire system data associated with one or more fire or smoke detector devices within the fire system maintenance system;
      analyze the collected fire system data to determine whether the collected fire system data includes an anomaly;
      determine a specific fire or smoke detector device will experience a fault or failure based on the determination that the collected fire system data includes the anomaly; and
      predict a number of service items to combine with an upcoming inspection schedule to address the specific fire or smoke detector device that will experience the fault or failure.

2. The remote computing device of claim 1, wherein determining whether the collected fire system data includes the anomaly further comprises comparing data collected from a particular fire or smoke detector device at a present time to data collected from the particular fire or smoke detector device at a previous time.

3. The remote computing device of claim 1, wherein determining whether the collected fire system data includes the anomaly further comprises comparing data collected from a particular fire or smoke detector device to data collected from other fire or smoke detector devices.

4. The remote computing device of claim 1, wherein determining whether the collected fire system data includes the anomaly further comprises comparing data collected to a threshold value stored on the remote computing device.

5. The remote computing device of claim 1, wherein determining the specific fire or smoke detector device will experience the fault or failure includes comparing information associated with a health condition of the specific fire or smoke detector device to a maintenance timeframe for one or more components of the specific fire or smoke detector device.

6. The remote computing device of claim 1, wherein determining whether the collected fire system data includes the anomaly further comprises:
   determine an event type for each device health event recorded in the collected fire system data;
   identify how many service items of each type are occurring over a time period; and
   determine a percentage of fire or smoke detector devices located within different buildings experiencing service items of each type contribute to a total number of false alarms.

7. The remote computing device of claim 1, further including executable instructions to predict when the specific fire or smoke detector device needs maintenance based on the determination that the collected fire system data includes the anomaly.

8. The remote computing device of claim 1, further including executable instructions to determine how many fire or smoke detector devices within a building are identified as having the anomaly.

9. The remote computing device of claim 1, wherein the one or more fire or smoke detector devices are located within different buildings.

10. A fire system maintenance system, comprising:
   a number of fire system detector devices;
   a remote computing device communicatingly connected to the number of fire system detector devices; and
   the remote computing device having a fire system maintenance solution application thereon and a memory within, wherein the memory includes executable instructions executed by a processor that when executed, cause the processor to:
      receive collected fire system data associated with the number of fire system detector devices;
      analyze the collected fire system data to determine whether the collected fire system data includes an anomaly;
      determine a specific fire system detector device among the number of fire system detector devices is at risk for fault or failure based on the determination that the collected fire system data includes the anomaly; and
      predict a number of service items to combine with an upcoming inspection schedule to address the specific fire system detector device at risk for fault or failure.

11. The fire system maintenance system of claim 10, wherein the remote computing device further includes a display to present to a user the collected fire system data, when the collected fire system data was collected, and key insights of the collected fire system data.

12. The fire system maintenance system of claim 11, wherein the executable instructions further include instructions to configure an arrangement of information displayed responsive to a user input.

13. The fire system maintenance system of claim 12, wherein the information displayed is displayed according to customer, building location, type of anomaly determined, service needed, number of anomalies detected, or priority item.

14. The fire system maintenance system of claim 12, wherein the information displayed includes an analysis of the collected fire system data identifying a distribution of a service event type identified among the collected fire system data and the number of fire system detector devices contributing to each event type identified.

15. A non-transitory computer readable medium having computer readable instructions stored thereon that are executable by a processor, that when executed, cause the processor to:
   receive collected fire system data associated with a number of fire system detector devices;
   analyze the collected fire system data to determine whether the collected fire system data includes an anomaly;
   determine a specific fire system detector device among the number of fire system detector devices is at risk for fault or failure based on the determination that the collected fire system data includes the anomaly; and
   predict a number of service items to combine with an upcoming inspection schedule to address the specific fire system detector device at risk for fault or failure.

16. The computer readable medium of claim 15, further including instructions to:

determine an event type for each device health event recorded in the collected fire system data; and determine an order of events occurring by quantity from most events to least events based on the identified event types over a period of time.

17. The computer readable medium of claim 15, further including instructions to determine whether the anomaly is included in the collected fire system data by determining when a threshold number of event types has been reached.

18. The computer readable medium of claim 15, wherein determining whether the anomaly is included in the collected fire system data includes analyzing the collected data for a particular fire system detector device, a particular group of fire system detector devices within a building, all fire system detector devices within the building, or fire system detector devices within multiple buildings of a facility.

19. The computer readable medium of claim 15, wherein determining whether the anomaly is included in the collected fire system data includes analyzing the collected data according to a hierarchy of service event types included in the collected data.

20. The computer readable medium of claim 15, further including instructions to display a location of the specific fire system detector device associated with the anomaly.

* * * * *